(12) United States Patent
Anders et al.

(10) Patent No.: US 11,019,014 B2
(45) Date of Patent: May 25, 2021

(54) SIMULTANEOUS MESSAGE BLOCKING AND DELIVERY

(71) Applicant: INTERNATIONAL BUSINESS MACHINES CORPORATION, Armonk, NY (US)

(72) Inventors: Kelley Anders, East New Market, MD (US); Lisa Seacat DeLuca, Baltimore, MD (US); Jeremy A. Greenberger, San Jose, CA (US); Jeremy R. Fox, Georgetown, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 113 days.

(21) Appl. No.: 16/211,660

(22) Filed: Dec. 6, 2018

(65) Prior Publication Data
US 2020/0186485 A1    Jun. 11, 2020

(51) Int. Cl.
*H04L 12/58*    (2006.01)
*G06F 40/30*    (2020.01)
*G06F 40/40*    (2020.01)
*G06F 40/106*   (2020.01)

(52) U.S. Cl.
CPC ............ *H04L 51/12* (2013.01); *G06F 40/106* (2020.01); *G06F 40/30* (2020.01); *G06F 40/40* (2020.01); *H04L 51/04* (2013.01)

(58) Field of Classification Search
CPC ......... H04L 51/30; H04L 51/04; H04L 51/32; H04L 51/34; G06F 40/30; G06F 40/40
See application file for complete search history.

(56) References Cited

U.S. PATENT DOCUMENTS

| 7,600,249 | B1* | 10/2009 | Blevins .............. H04N 7/17318 725/78 |
| 8,082,151 | B2* | 12/2011 | Bangalore .............. G06F 40/30 704/251 |
| 9,166,944 | B2 | 10/2015 | Hamilton et al. |
| 9,923,846 | B2* | 3/2018 | Heyrani Nobari ...... H04L 51/04 |
| 2015/0195406 | A1 | 7/2015 | Dwyer et al. |
| 2016/0328416 | A1* | 11/2016 | Rose ....................... H04L 63/08 |

(Continued)

OTHER PUBLICATIONS

Cohn, "An Agile Estimating and Planning Technique", https://www.mountaingoatsoftware.com/agile/planning-poker, accessed Apr. 1, 2018, 2 pages.

(Continued)

*Primary Examiner* — Uzma Alam
(74) *Attorney, Agent, or Firm* — Michael O'Keefe; Andrew D Wright; Roberts Calderon Safran & Cole, P.C.

(57) ABSTRACT

Methods and systems for simultaneous message blocking and delivery are disclosed. A method includes: receiving, by a computing device, from a first user, a first message and a request to transmit the first message as a simultaneous message; receiving, by the computing device, an additional message from each of at least one additional user; determining, by the computing device, using natural language processing, a similarity score for each of the additional messages; and in response to the similarity score for each of the additional messages exceeding a predetermined threshold, the computing device transmitting the first message and the additional messages.

16 Claims, 4 Drawing Sheets

(56) References Cited

U.S. PATENT DOCUMENTS

| | | | |
|---|---|---|---|
| 2017/0076431 A1* | 3/2017 | Dai | G06T 5/009 |
| 2017/0220527 A1 | 8/2017 | Deluca et al. | |
| 2017/0366483 A1* | 12/2017 | Heyrani Nobari | H04L 51/04 |
| 2018/0232356 A1* | 8/2018 | Gonzalo Vaca | H04L 51/18 |
| 2019/0020606 A1* | 1/2019 | Vasudeva | G06F 40/30 |
| 2019/0340001 A1* | 11/2019 | Vysotsky | G06F 9/455 |
| 2020/0134422 A1* | 4/2020 | Gliozzo | G06N 3/0454 |

OTHER PUBLICATIONS

Wiegers, "Stop Promising Miracles | Dr Dobb's", http://www.drdobbs.com/stop-promising-miracles/184414570, Feb. 1, 2000, 7 pages.

Anonymous, "System and Method to Ensure Coordination of Message Delivery", IBM, IP.com Number: IPCOM000174127D, Aug. 27, 2008, 3 pages.

Anonymous, "Planning poker", Wikipedia, https://en.wikipedia.org/wiki/Planning_poker, accessed Nov. 30, 2018, 3 pages.

* cited by examiner

SIMULTANEOUS MESSAGE BLOCKING AND DELIVERY

BACKGROUND

The present invention generally relates to computing devices and, more particularly, to methods and systems for simultaneous message blocking and delivery.

A messaging session (e.g., text messaging) or a chat session typically includes two or more participating users who are engaged in a conversation. The text messaging session or chat session typically takes place within a graphical user interface that displays real-time responses from each of the plurality of participating users. The responses commonly include text, graphics, videos, sounds, and/or attachments such as files. Each of the responses are normally arranged in order of a time when a user sent the response. Additionally, the graphical user interface typically displays a list of the two or more participating users.

In conversations, there are times when participants in a conversation want to have their responses presented to other participants simultaneously. For example, when a participant in a messaging session or a chat session sends a sensitive message to another participant, the participant may want to know that the other participant is going to respond in a similar manner without any outside influence. Conventional messaging and chat methods and systems do not provide a way for participants to have their responses presented to other participants simultaneously.

SUMMARY

In a first aspect of the invention, there is a method that includes: receiving, by a computing device, from a first user, a first message and a request to transmit the first message as a simultaneous message; receiving, by the computing device, an additional message from each of at least one additional user; determining, by the computing device, using natural language processing, a similarity score for each of the additional messages; and in response to the similarity score for each of the additional messages exceeding a predetermined threshold, the computing device transmitting the first message and the additional messages. This aspect of the invention addresses the above-mentioned shortcomings associated with conventional messaging and chat methods and systems that do not provide a way for participants to have their responses presented to other participants simultaneously.

In another aspect of the invention, there is a computer program product that includes a computer readable storage medium having program instructions embodied therewith. The program instructions are executable by a computing device to cause the computing device to: receive, from a first user, a query, a first message, and a request to transmit the first message as a simultaneous message; transmit the query to at least one additional user; receive an additional message from each of the at least one additional user; determine, using natural language processing, a responsiveness score for each of the additional messages; and in response to the responsiveness score for each of the additional messages exceeding a predetermined threshold, transmit the first message and the additional messages. This aspect of the invention addresses the above-mentioned shortcomings associated with conventional messaging and chat methods and systems that do not provide a way for participants to have their responses presented to other participants simultaneously.

In another aspect of the invention, there is a system that includes: a hardware processor, a computer readable memory, and a computer readable storage medium associated with a computing device; program instructions configured to receive, from a first user, a first message and a request to transmit the first message as a simultaneous message; program instructions configured to receive an additional message from each of at least one additional user; program instructions configured to determine, using natural language processing, a similarity score for each of the additional messages; and program instructions configured to, in response to the similarity score for at least one of the additional messages being less than a predetermined threshold, alert the first user and the at least one additional user that at least one of the additional messages is dissimilar, wherein the program instructions are stored on the computer readable storage medium for execution by the hardware processor via the computer readable memory. This aspect of the invention addresses the above-mentioned shortcomings associated with conventional messaging and chat methods and systems that do not provide a way for participants to have their responses presented to other participants simultaneously.

In another aspect of the invention, there is a computer program product that includes a computer readable storage medium having program instructions embodied therewith. The program instructions are executable by a computing device to cause the computing device to: receive, from a first user, a query, a first message, and a request to transmit the first message as a simultaneous message; provide the query to each of at least one additional user and prompt each of the at least one additional user for an additional message; receive the additional message from each of at least one additional user; determine, using natural language processing, a similarity score for each of the additional messages; in response to the similarity score for each of the additional messages being greater than or equal to a predetermined threshold, transmit the first message and the additional messages; and in response to the similarity score for at least one of the additional messages being less than the predetermined threshold: alert the first user and the at least one additional user that at least one of the additional messages is dissimilar; and transmit the first message and the additional messages based upon instructions received from the first user and the at least one additional user. This aspect of the invention addresses the above-mentioned shortcomings associated with conventional messaging and chat methods and systems that do not provide a way for participants to have their responses presented to other participants simultaneously.

In another aspect of the invention, there is a method that includes: receiving, by a computing device of a first user, a first message and a request to send the first message as a simultaneous message; sending, by the computing device of the first user to a computer server, the first message and the request; and receiving, by the computer device of the first user from the computer server, an additional message from each of at least one additional user substantially simultaneously with a computer device of each of the at least one additional user receiving the first message, wherein a similarity score for each of the additional messages, determined by the computer server using natural language processing, exceeds a predetermined threshold. This aspect of the invention addresses the above-mentioned shortcomings associated with conventional messaging and chat methods and systems that do not provide a way for participants to have their responses presented to other participants simultaneously.

In an optional aspect of the invention, in response to receiving the request, the computing device prompts each of the at least one additional user for the additional message.

In another optional aspect of the invention, a query is received from the first user, and in response to receiving the request, the computing device provides the query to each of the at least one additional user and prompts each of the at least one additional user for the additional message that is a response to the query.

In another optional aspect of the invention, the transmitting the first message and the additional messages comprises causing the first message and the additional messages to be displayed substantially simultaneously on computing devices associated with the first user and the at least one additional user.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
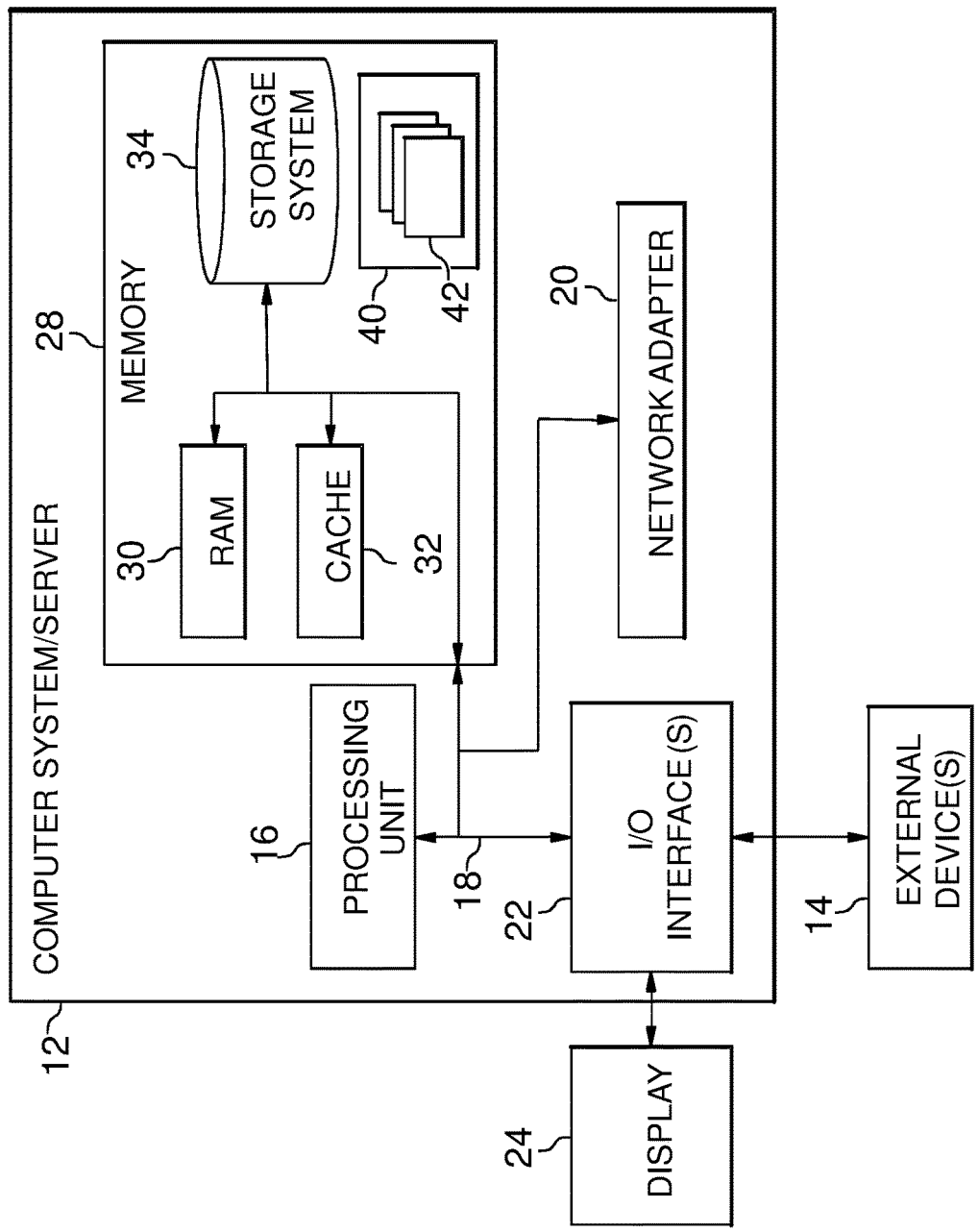
FIG. 1 depicts a computer system in accordance with aspects of the invention.

The present invention generally relates to computing devices and, more particularly, to methods and systems for simultaneous message blocking and delivery. As described herein, aspects of the invention include a method and system that receive a request for a simultaneous message, receive and store messages from at least two users, analyze the stored messages using natural language processing to determine similarity, and transmit the stored messages in response to the similarity exceeding a predetermined threshold.

Aspects of the invention address the problem of participants in a conversation wanting to know that the other participant is going to respond in a similar manner without any outside influence by providing a system and method that block messages until all participants in a messaging session or a chat session present their messages simultaneously. Accordingly, embodiments improve the functioning of a computer by providing methods and systems for simultaneous message blocking and delivery. In particular, embodiments improve software by providing an improved mechanism for receiving a request for a simultaneous message, receiving and storing messages from at least two users, analyzing the stored messages using natural language processing to determine similarity, and transmitting the stored messages in response to the similarity exceeding a predetermined threshold. These software improvements provide a trusted mechanism for blocking messages until all participants in a conversation present their messages simultaneously. These software improvements also allow for participants in a messaging session or a chat session to specify additional criteria that must be satisfied before the stored messages are transmitted. Additionally, implementations of the invention use techniques that are, by definition, rooted in computer technology (e.g., natural language processing). For example, natural language processing includes using computers to process, understand, and interpret human languages.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, a schematic of an example of a computing infrastructure is shown. Computing infrastructure 10 is only one example of a suitable computing infrastructure and is not intended to suggest any limitation as to the scope of use or functionality of embodiments of the invention described herein. Regardless, computing infrastructure 10 is capable of being implemented and/or performing any of the functionality set forth hereinabove.

In computing infrastructure 10 there is a computer system (or server) 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computing infrastructure 10 is shown in the form of a general-purpose computing device. The components of computer system 12 may include, but are not limited to, one or more processors or processing units (e.g., CPU) 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
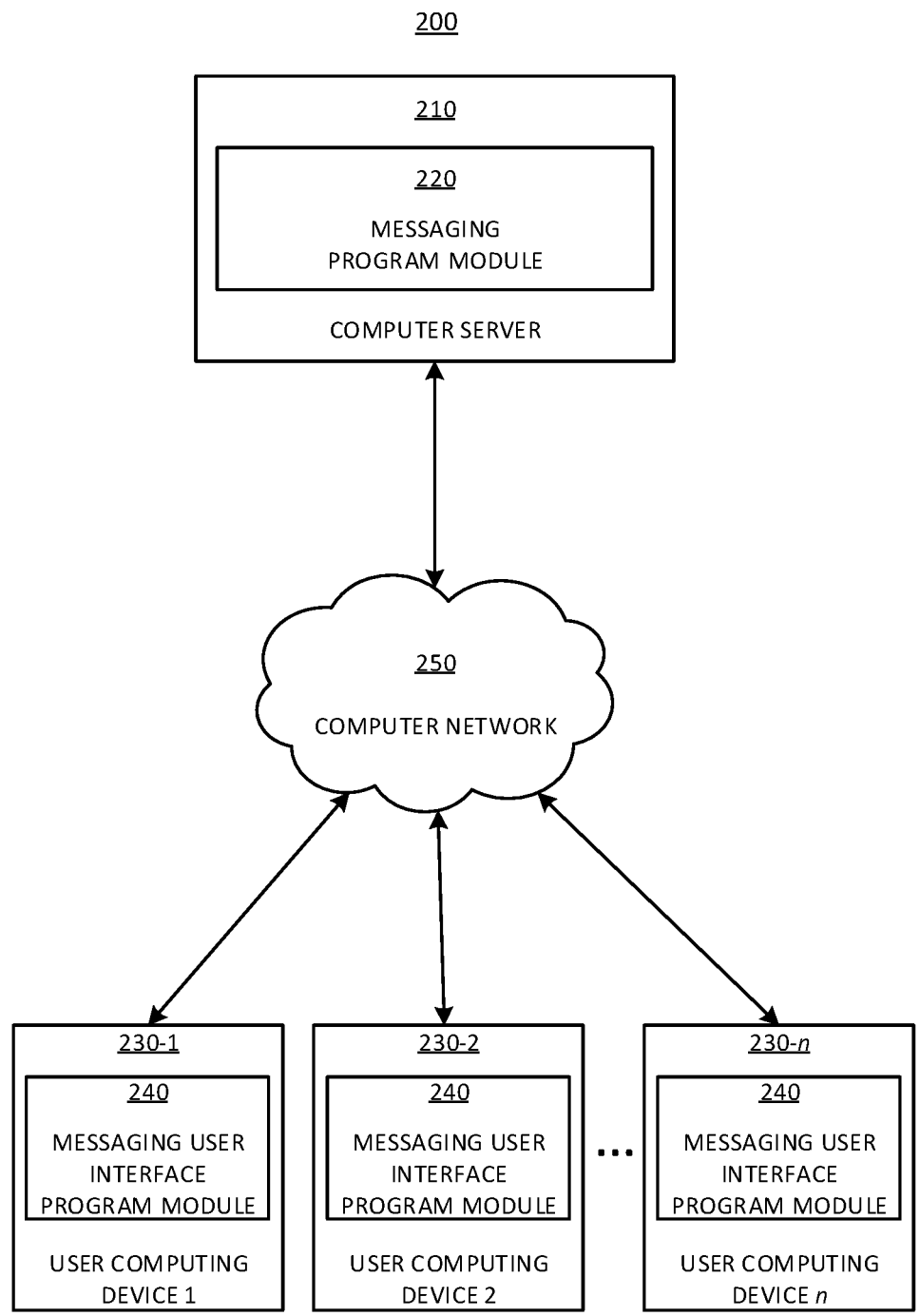
FIG. 2 depicts an illustrative environment in accordance with aspects of the invention.

FIG. 2 depicts an illustrative environment 200 in accordance with aspects of the invention. As shown, the environment 200 comprises a computer server 210 and a plurality of user computing devices 230-1, 230-2, . . . , 230-n which are in communication via a computer network 250. In embodiments, the computer network 250 is any suitable network including any combination of a LAN, WAN, or the Internet. In embodiments, the computer server 210 and the user computing devices 230-1, 230-2, . . . , 230-n are physically collocated, or, more typically, are situated in separate physical locations.

The quantity of devices and/or networks in the environment 200 is not limited to what is shown in FIG. 2. In practice, the environment 200 may include additional devices and/or networks; fewer devices and/or networks; different devices and/or networks; or differently arranged devices and/or networks than illustrated in FIG. 2. Also, in some implementations, one or more of the devices of the environment 200 may perform one or more functions described as being performed by another one or more of the devices of the environment 200.

In embodiments, the computer server 210 is a computer device comprising one or more elements of the computer system/server 12 (as shown in FIG. 1). In particular, the computer server 210 is implemented as hardware and/or software using components such as mainframes; RISC (Reduced Instruction Set Computer) architecture based servers; servers; blade servers; storage devices; networks and networking components; virtual servers; virtual storage; virtual networks, including virtual private networks; virtual applications and operating systems; and virtual clients.

In embodiments, the computer server 210 includes a messaging program module 220, which includes hardware and/or software and is one or more of the program modules 42 shown in FIG. 1. According to an embodiment, the messaging program module 220 includes program instructions for performing simultaneous message blocking and delivery. In embodiments, the program instructions included in the messaging program module 220 of the computer server 210 are executed by one or more hardware processors.

Still referring to FIG. 2, in embodiments, each of the user computing devices 230-1, 230-2, . . . , 230-n is a computer device comprising one or more elements of the computer system/server 12 (as shown in FIG. 1) and is a desktop computer, a laptop computer, a mobile device such as a cellular phone, tablet, personal digital assistant (PDA), or other computing device. In other embodiments, each of the user computing devices 230-1, 230-2, . . . , 230-n is implemented as hardware and/or software using components such as mainframes; RISC (Reduced Instruction Set Computer) architecture based servers; servers; blade servers; storage devices; networks and networking components; virtual servers; virtual storage; virtual networks, including virtual private networks; virtual applications and operating systems; and virtual clients.

In embodiments, each of the user computing devices 230-1, 230-2, . . . , 230-n is usable by a user to participate in a messaging session or a chat session hosted by the computer server 210. In particular, each of the user computing devices 230-1, 230-2, . . . , 230-n includes a messaging user interface program module 240, which includes hardware and/or software and is one or more of the program modules 42 shown in FIG. 1. According to an embodiment, the messaging user interface program module 240 includes program instructions for displaying a messaging graphical user interface on the user computing device 230-1, 230-2, . . . , 230-n, including messages from a plurality of users participating in a messaging session or a chat session. The messaging user interface program module 240 is usable by a user of the user computing device 230-1, 230-2, . . . , 230-n who is participating in the messaging session or the chat session to send a message including text, graphics, videos, sounds, and/or attachments such as files to the messaging program module 220 on the computer server 210 via the computer network 250. The messaging program module 220 on the computer server 210 then transmits the message to the messaging user interface program module 240 on each of the user computing devices 230-1, 230-2, . . . , 230-n used by a user who is participating in the messaging session or the chat session and causes the messaging user interface module 240 to display the message.

Figure 3:
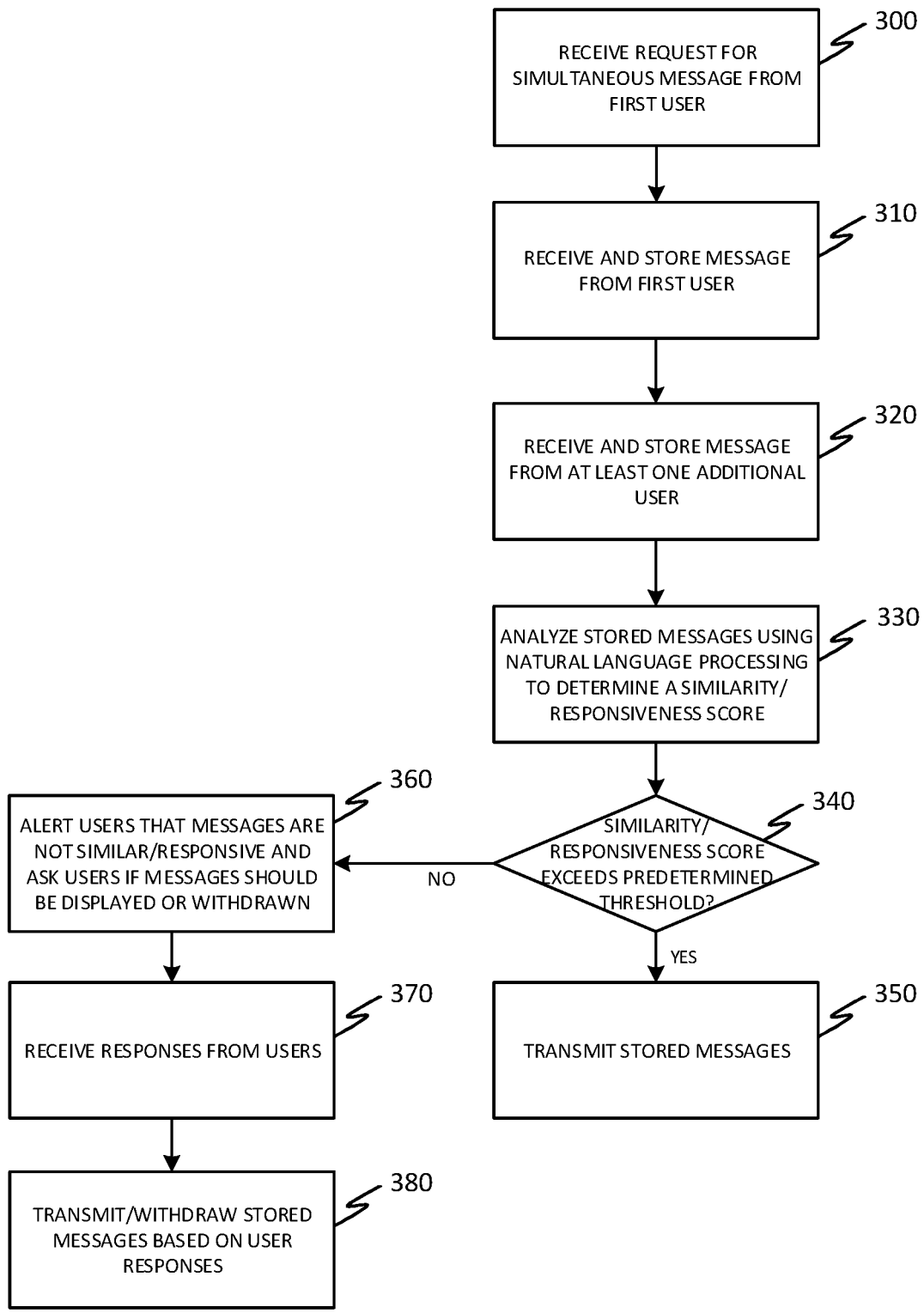
FIG. 3 depicts a flowchart of an exemplary method performed in accordance with aspects of the invention.

FIG. 3 depicts a flowchart of an exemplary method performed by the messaging program module 220 of the computer server 210 in accordance with aspects of the invention. The steps of the method are performed in the environment of FIG. 2 and are described with reference to the elements shown in FIG. 2.

At step 300, the computer server 210 receives a request for a simultaneous message from a first user. In embodiments, the first user is participating in a messaging session or a chat session with one or more additional users. The messaging session or the chat session may be controlled by a single user, may be controlled by multiple individuals (e.g., a group or consortium of users), or may be system controlled (e.g., provided as a cloud-based service). The messaging program module 220 receives the request from via the messaging user interface program module 240 on one of the user computing devices 230-1, 230-2, . . . , 230-*n* (of FIG. 2). In an example, the messaging user interface program module 240 provides a user interface including one or more options for specifying how a message is to be sent, including an option to send as a simultaneous message. In response to the first user selecting the option to send as a simultaneous message, the messaging user interface program module 240 on the user computing device 230-1, 230-2, . . . , 230-*n* transmits, to the computer server 210, the request for the simultaneous message from the first user, and this request is received by the computer server 210 at step 300.

In embodiments, optionally, the messaging user interface program module 240 provides a user interface including a text box into which the first user may input a query associated with the request for a simultaneous message. The query is transmitted by the messaging user interface program module 240 to the messaging program module 220 on the computer server 210, which then causes the query to be displayed by the messaging user interface program module 240 to the one or more additional users participating in the messaging session or the chat session in the user interface, as described below with respect to step 320.

At step 310, the computer server 210 receives and stores a message from the first user. In embodiments, the messaging program module 220 receives the message from the first user via the messaging user interface program module 240 on one of the user computing devices 230-1, 230-2, . . . , 230-*n* (of FIG. 2). In particular, the messaging user interface program module 240 presents a user interface including a text input box into which the first user enters the message using the user computing device 230-1, 230-2, . . . , 230-*n*. In response to the first user selecting a send button, the messaging user interface program module 240 causes the message to be sent to the messaging program module 220 on the computer server 210. In response to receiving the message from the first user, the messaging program module 220 stores the message in a storage device located in or accessible to the computer server 210.

In another embodiment, the first user enters the message into the text input box presented by the messaging user interface program module 240 prior to selecting the option to send as a simultaneous message at step 300. In this embodiment, the selection in the messaging user interface program module 240 of the option to send as a simultaneous message also causes the message entered into the text input box to be sent by the messaging user interface program module 240 to the messaging program module 220 on the computer server 210. Accordingly, in this embodiment, the receiving of the request for the simultaneous message at step 300 and the receiving of the message from the first user at step 310 occurs simultaneously or substantially simultaneously. In response to receiving the message from the first user, the messaging program module 220 stores the message in a storage device located in or accessible to the computer server 210.

At step 320, the computer server 210 receives and stores a message from at least one additional user. In embodiments, each additional user participating in the messaging session or the chat session with the first user enters a message into a text input box presented by the messaging user interface program module 240 in a user interface on the user computing device 230-1, 230-2, . . . , 230-*n*. In response to the additional user selecting a send button, the messaging user interface program module 240 causes the message to be sent to the messaging program module 220 on the computer server 210. In response to receiving the message from the additional user, the messaging program module 220 stores the message in a storage device located in or accessible to the computer server 210.

In embodiments, at step 320, the messaging user interface program module 240 on the user computing device 230-1, 230-2, . . . , 230-*n* of each of the additional users displays in the user interface a message indicating that the first user has requested a simultaneous message and instructing the additional user to enter his or her simultaneous message into the text input box. In response to the additional user selecting a send button in the user interface, the messaging user interface program module 240 causes the message to be sent to the messaging program module 220 on the computer server 210. In response to receiving the message from the additional user, the messaging program module 220 stores the message in a storage device located in or accessible to the computer server 210.

In other embodiments, at step 320, the messaging user interface program module 240 on the user computing device 230-1, 230-2, . . . , 230-*n* of each of the additional users displays a query from the first user in the user interface and, optionally, an indication that the first user has requested a simultaneous message. For example, the messaging user interface program module 240 may display in the user interface, "What is your favorite color?" or "How many days will it take to reach milestone x?" as the query. In this embodiment, the messaging user interface program module 240 instructs the additional user to enter his or her response to the query into the text input box in the user interface. In response to the additional user selecting a send button, the messaging user interface program module 240 causes the response to the query to be sent to the messaging program module 220 on the computer server 210 as the message. In response to receiving the message from the additional user, the messaging program module 220 stores the message in a storage device located in or accessible to the computer server 210.

At step 330, the computer server 210 analyzes the stored messages using natural language processing to determine a similarity/responsiveness score. In embodiments, the messaging program module 220 analyzes each of the messages received at step 320 using a mediator system. The mediator system uses natural language processing to determine, for each of the messages received at step 320, a level of similarity between the message received at step 320 and the message received at step 310, and determine a similarity score for the message received at step 320 based on the determined level of similarity. The similarity score assigned to each message received at step 320 indicates, for example, a level of similarity to the message received at step 310. In an example, a relatively higher similarity score indicates that the message received at step 320 is relatively more similarity to the message received at step 310, and a relatively lower similarity score indicates that the message is relatively less similar to the message received at step 310.

In other embodiments, if the messaging program module 220 received a query from the first user at step 300, the messaging program module 220 analyzes each of the messages received at step 320 using a mediator system. The mediator system uses natural language processing to determine, for each of the message received at step 320, a level of responsiveness of the message received at step 320 to the query, and determine a responsiveness score for the message received at step 320 based on the determined level of responsiveness. In an example, a relatively higher responsiveness score indicates that the message received at step 320 is relatively more responsive to the query, and a relatively lower responsiveness score indicates that the message is relatively less responsive to the query.

In embodiments, at step 330 the mediator system used by the messaging program module 220 uses natural language processing to determine a topic of each of the messages received at steps 310 and 320 and compares the determined topics. In an example, the mediator system determines that the topic of each of the messages is the name of a movie.

In other embodiments, at step 330 the mediator system used by the messaging program module 220 uses natural language processing to determine a sentiment of each of the messages received at steps 310 and 320 and compares the determined sentiments.

In other embodiments, at step 330 the mediator system used by the messaging program module 220 uses natural language processing to determine types of content of each of the messages received at steps 310 and 320 and compares the determined types of content. In an example, the mediator system determines whether messages relate to a number or a price.

In other embodiments, at step 330 the mediator system used by the messaging program module 220 uses natural language processing to determine a temporal basis of each of the messages received at steps 310 and 320 and compares the determined temporal bases. In an example, the mediator system determines whether messages are sensitive to a particular deadline of time or a real-world event based on a time start or time ending period.

In other embodiments, at step 330 the mediator system used by the messaging program module 220 uses natural language processing to determine a moment (e.g., a portion of a conversation related to a particular time period and/or topic) to which each of the messages received at steps 310 and 320 is related and compares the determined moments.

In other embodiments, at step 330 the mediator system used by the messaging program module 220 uses natural language processing to determine that a message received at step 320 corresponds to a message received at step 310 if the message received at step 320 contains an indication that the message is in response to the request for a simultaneous message.

At step 340, the computer server 210 determines whether or not a similarity/responsiveness score exceeds a predetermined threshold. In embodiments, the messaging program module 220 determines whether or not the similarity/responsiveness score of each of the messages received at step 320, as determined at step 330, exceeds the predetermined threshold.

The predetermined threshold may be set by an administrator of the computer server 210. A relatively higher threshold will increase the level of similarity/responsiveness required for messages to be considered similar/responsive, and a relatively lower threshold will decrease the level of similarity/responsiveness required for messages to be considered similar/responsive. In an example, a threshold of 80% may be used.

If it is determined at step 340 that the similarity/responsiveness score for all of the messages received at step 320 exceeds the predetermined threshold, then flow proceeds to step 350. On the other hand, if it is determined at step 340 that the similarity/responsiveness score for all the messages received at step 320 does not exceed the predetermined threshold (i.e., the similarity/responsiveness score for at least one message received at step 320 does not exceed the predetermined threshold), then the flow proceeds to step 360.

In other embodiments, if it is determined at step 340 that the similarity/responsiveness score for at least a predetermined proportion of the messages received at step 320 exceeds the predetermined threshold, then flow proceeds to step 350. On the other hand, if it is determined at step 340 that it is not the case that the similarity/responsiveness score for at least a predetermined proportion of the messages received at step 320 exceeds the predetermined threshold, then flow proceeds to step 360.

At step 350, the computer server 210 transmits the stored messages. In embodiments, the messaging program module 220 transmits each of the messages received and stored at steps 310 and 320 to the messaging user interface program module 240 running on each of the user computing devices 230-1, 230-2, . . . , 230-n used by the users participating in the messaging session or the chat session. The messaging user interface program module 240 on each of the user computing devices 230-1, 230-2, . . . , 230-n then causes the transmitted messages to be displayed in the user interface. In this manner, the messaging program module 220 causes the plurality of messages received at steps 310 and 320 to be displayed simultaneously or substantially simultaneously (e.g., within a few seconds) on a user interface on each of the user computing devices 230-1, 230-2, . . . , 230-n by the messaging user interface program module 240. In other words, the messaging program module 220 transmits the plurality of messages received at steps 310 and 320 to each of the user computing devices 230-1, 230-2, . . . , 230-n within a period of a few seconds, or preferably, less than one second, such that, unless delays are occurring on the computer network 250, each of the user computing devices 230-1, 230-2, . . . , 230-n displays the plurality of messages received at steps 310 and 320 within a few seconds (and preferably, less than one second) of the plurality of messages received at steps 310 and 320 being displayed on the other user computing devices 230-1, 230-2, . . . , 230-n.

In embodiments, optionally, the messaging program module 220 also transmits a similarity score for each of the messages received and stored at step 320 to the messaging user interface program module 240 running on each of the user computing devices 230-1, 230-2, . . . , 230-n used by the users participating in the messaging session or the chat session. The messaging user interface program module 240 on each of the user computing devices 230-1, 230-2, . . . , 230-n then causes the similarity score to be displayed in the user interface along with the respective message.

In embodiments, in the event that at step 340 that the similarity/responsiveness score for at least a predetermined proportion of the messages received at step 320 exceeds the predetermined threshold, at step 350, the messaging program module 220 also transmits a similarity running total, indicating a number of similar responses and a number of total responses. The messaging user interface program module 240 on each of the user computing devices 230-1, 230-2, . . . , 230-n then causes the similarity running total to be displayed in the user interface. In an example, the messaging user interface program module 240 displays a running total indicating that 5 of 10 responses are similar.

In embodiments, the messaging user interface program module 240 on each of the user computing devices 230-1, 230-2, . . . , 230-n displays a graphic or animation (e.g., fireworks) on the user interface to recognize or celebrate the similar answers. In other embodiments, a gamification approach may be used in which the messaging program module 220 assigns points to each of the users who provided similar responses at step 320. The messaging program module 220 transmits the point totals for each of the users to the messaging user interface program module 240, which then displays the point totals for each user on the user interface.

Additionally, in embodiments, the messaging program module transmits information on a percentage of the time that two (or more) users provide similar answers (e.g., 70% of the time, you and persons x and y give the same answers). In other embodiments, points may be awarded based upon an amount of time taken by a user to answer (e.g., if the user responds in the next two minutes, then 10 points are awarded; if the user responds in the next 5 minutes, then 5 points are awarded). The gamification approach may be used to encourage continued engagement by the users.

At step 360, the computer server 210 alerts the users that the messages are not similar/responsive and asks the users if the messages should be displayed or withdrawn. In embodiments, the messaging program module 220 causes the messaging user interface program module 240 to display, on the user interface on each of the user computing devices 230-1, 230-2, . . . , 230-n, an indication that not all (or, in other embodiments, not at least the predetermined proportion) of the messages of the messages received at step 320 were similar/responsive. The messaging program module 220 also causes the messaging user interface program module 240 to display, on the user interface on each of the user computing devices 230-1, 230-2, . . . , 230-n from which a non-similar/non-responsive message was received at step 320, a prompt asking the user whether their message (received at step 320) should be displayed or withdrawn. In an example, the messaging user interface program module 240 displays, as the prompt, "These messages do not match, do you want to grant others access to your message anyway?"

At step 370, the computer server 210 receives responses from the users. In embodiments, in response to a user selection in the user interface on each of the user computing devices 230-1, 230-2, . . . , 230-n from which a non-similar/non-responsive message was received at step 320, the messaging user interface program module 240 transmits to the messaging program module 220 on the computers server 210 the responses indicating whether the user's message is to be displayed or withdrawn.

At step 380, the computer server 210 transmits/withdraws the stored messages based on the user responses. In embodiments, the messaging program module 220 transmits each of the messages received and stored at steps 310 and 320 from users indicating at step 370 that their messages should be transmitted. These messages are transmitted by the messaging program module 220 to the messaging user interface program module 240 running on each of the user computing devices 230-1, 230-2, . . . , 230-n used by the users participating in the messaging session or the chat session. The messaging program module 220 withdraws (e.g., does not transmit and, optionally, deletes from storage) the messages received and stored at steps 310 and 320 from users indicating at step 370 that their messages should be withdrawn.

The messaging user interface program module 240 on each of the user computing devices 230-1, 230-2, . . . , 230-n then causes the transmitted messages to be displayed in the user interface. In this manner, the messaging program module 220 causes the plurality of messages received at steps 310 and 320 from users who indicated that their messages should be transmitted to be displayed simultaneously or substantially simultaneously on a user interface on each of the user computing devices 230-1, 230-2, . . . , 230-n by the messaging user interface program module 240. Additionally, the users may be able to gain insight into the topics that were compared but not matched.

In embodiments, optionally, the messaging program module 220 also transmits a similarity score for each of the transmitted messages to the messaging user interface program module 240 running on each of the user computing devices 230-1, 230-2, . . . , 230-n used by the users participating in the messaging session or the chat session. The messaging user interface program module 240 on each of the user computing devices 230-1, 230-2, . . . , 230-n then causes the similarity score to be displayed in the user interface along with the respective message.

Figure 4:
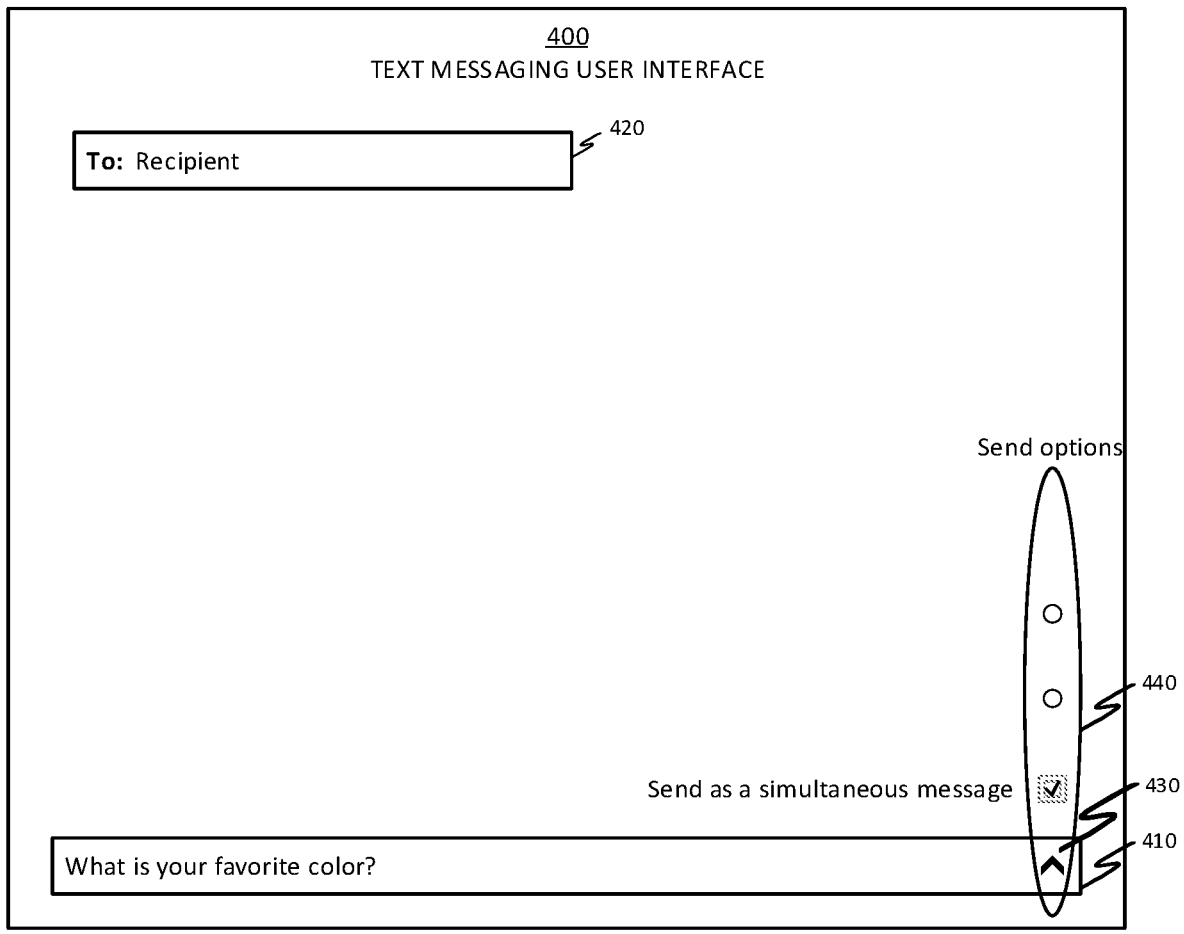
FIG. 4 depicts an illustrative example of a text messaging user interface displayed on a display of a user computing device in accordance with aspects of the invention.

FIG. 4 depicts an illustrative example of a text messaging user interface 400 displayed by the messaging user interface program module 240 on a display of a user computing device 230-1, 230-2, . . . , 230-n in accordance with aspects of the invention. The text messaging user interface 400 is an example implementation of the method of FIG. 3. The text messaging user interface 400 includes a text box 410 into which messages (and queries) are input (e.g., the message received from the first user at step 310 of FIG. 3 and the message received from at least one additional user at step 320 of FIG. 3), a recipient list 420, a send button 430, and send options 440. The send options 440 include an option to send as a simultaneous message. In an example, in response to a first user entering a message in the text box 410 and selecting the option to send as a simultaneous message from the send options 440, the request received at step 300 of FIG. 3 and the message received at step 310 of FIG. 3 are transmitted by the messaging user interface program module 240 on the user computing device 230-1, 230-2, . . . , 230-n to messaging program module 220 on the computer server 210. Additionally, in the example, the messages transmitted at step 350 and/or at step 380 of FIG. 3 are displayed in the text messaging user interface 400 displayed by the messaging user interface program module 240 on the display of a user computing device 230-1, 230-2, . . . , 230-n.

In embodiments, a service provider could offer to perform the processes described herein. In this case, the service provider can create, maintain, deploy, support, etc., the computer infrastructure that performs the process steps of the invention for one or more customers. These customers may be, for example, any business that uses cloud computing technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   receiving, by a computing device and from a first user, a first message and a request to transmit the first message as a simultaneous message;
   receiving, by the computing device, an additional message from each of at least two additional users, each of the additional messages being in response to the first message;
   determining, by the computing device, using natural language processing, a similarity score for each of the additional messages, the similarity score being determined based on a similarity between the first message and the additional message; and
   in response to the similarity score for each of the additional messages exceeding a predetermined threshold, the computing device transmitting the first message, the additional messages and the similarity score for each of the additional messages to the first user and the additional users,
   wherein the transmitting comprises transmitting the first message, the additional messages, and the similarity scores substantially simultaneously to the first user and the additional users.

2. The method according to claim 1, further comprising, in response to receiving the request, the computing device prompting each of the additional users for the additional message.

3. The method according to claim 1, further comprising:
   receiving, by the computing device, a query from the first user; and
   in response to receiving the request, the computing device providing the query to each of the additional users and prompting each of the additional users for the additional message that is a response to the query.

4. The method according to claim 1, wherein the similarity is determined based on a topic of the first message and the additional message.

5. The method according to claim 1, wherein the similarity is determined based on a sentiment of the first message and the additional message.

6. The method according to claim 1, wherein
   the transmitting the first message and the additional messages comprises causing the first message and all of the additional messages exceeding the predetermined threshold to be displayed substantially simultaneously on computing devices associated with the first user and the additional users.

7. The method according to claim 1, wherein the request to transmit the first message is a request to transmit the first message to the additional users as a simultaneous message.

8. The method according to claim 1, wherein the simultaneous message is a message for which all of the additional messages are blocked from being transmitted to the additional users until all of the additional messages that are to be transmitted are transmitted substantially simultaneously.

9. The method according to claim 1, wherein the similarity score is determined for a predetermined portion of the additional messages.

10. A method comprising:
    receiving, by a computing device and from a first user, a first message and a request to transmit the first message to a plurality of additional users as a simultaneous message;
    receiving, by the computing device, a responses from the additional users, the responses being in response to the first message;
    determining, by the computing device, using natural language processing, a similarity score for each of the responses, the similarity score being determined based on a similarity between the first message and the responses; and
    transmitting, by the computing device, the first message, the responses and the similarity score for each of the responses substantially simultaneously to the first user and the additional users, the transmitting being in response to the similarity score for each of the responses exceeding a predetermined threshold,
    wherein the simultaneous message is a message for which all responses to the first message are blocked from being transmitted to the additional users until all of the responses that are to be transmitted are transmitted substantially simultaneously.

11. A method comprising:
    receiving, by a computing device and from a first user, a first message and a request to transmit the first message to a plurality of additional users as a simultaneous message;
    receiving, by the computing device, an additional message from at least two of the additional users, each of the additional messages being in response to the first message;
    determining, by the computing device, using natural language processing, a similarity score for each of the additional messages, the similarity score being determined based on a similarity between the first message and the additional message;
    in response to the similarity score for each of the additional messages exceeding a predetermined threshold, the computing device transmitting the first message, the additional messages and the similarity score for each of the additional messages to the first user and the additional users,
    wherein the transmitting comprises transmitting the first message, the additional messages, and the similarity scores substantially simultaneously to the first user and the additional users.

12. The method according to claim 11, wherein the simultaneous message is a message for which all of the additional messages are blocked from being transmitted to the additional users until all of the additional messages that are to be transmitted are transmitted substantially simultaneously.

13. A computer program product comprising one or more computer readable storage media having program instructions collectively stored on the one or more computer readable storage media, the program instructions executable to:
    receive, from a first user, a first message and a request to transmit the first message to a plurality of additional users as a simultaneous message;

receive an additional message from each of at least two additional users, each of the additional messages being in response to the first message;

determine, using natural language processing, a similarity score for each of the additional messages, the similarity score being determined based on a similarity between the first message and the additional message; and in response to the similarity score for each of the additional messages exceeding a predetermined threshold, transmit the first message, the additional messages and the similarity score for each of the additional messages to the first user and the additional users, wherein the transmitting comprises transmitting the first message, the additional messages, and the similarity scores substantially simultaneously to the first user and the additional users.

14. The computer program product according to claim 13, wherein the simultaneous message is a message for which all of the additional messages are blocked from being transmitted to the additional users until all of the additional messages that are to be transmitted are transmitted substantially simultaneously.

15. A system comprising:

a hardware processor, a computer readable memory, and a computer readable storage medium associated with a computing device;

program instructions configured to receive, from a first user, a first message and a request to transmit the first message to a plurality of additional users as a simultaneous message;

program instructions configured to receive an additional message from each of at least two additional users, each of the additional messages being in response to the first message;

program instructions configured to determine, using natural language processing, a similarity score for each of the additional messages, the similarity score being determined based on a similarity between the first message and the additional message; and program instructions configured to transmit the first message, the additional messages and the similarity score for each of the additional messages to the first user and the additional users, the transmitting being in response to the similarity score for each of the additional messages exceeding a predetermined threshold, wherein the transmitting comprises transmitting the first message, the additional messages, and the similarity scores substantially simultaneously to the first user and the additional users, and the program instructions are stored on the computer readable storage medium for execution by the hardware processor via the computer readable memory.

16. The system according to claim 15, wherein the simultaneous message is a message for which all of the additional messages are blocked from being transmitted to the additional users until all of the additional messages that are to be transmitted are transmitted substantially simultaneously.

* * * * *